(12) United States Patent
Hotra (10) Patent No.: US 8,522,237 B2
(45) Date of Patent: Aug. 27, 2013

(54) VIRTUALIZING EMBEDDED SYSTEMS

(75) Inventor: Jonathan Nicholas Hotra, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1473 days.

(21) Appl. No.: 12/099,898

(22) Filed: Apr. 9, 2008

(65) Prior Publication Data

US 2009/0260006 A1    Oct. 15, 2009

(51) Int. Cl.
 *G06F 9/455*    (2006.01)
(52) U.S. Cl.
 USPC ........... 718/1; 701/1; 701/21; 701/24; 701/36
(58) Field of Classification Search
 None
 See application file for complete search history.

(56) References Cited

U.S. PATENT DOCUMENTS

| | | | |
|---|---|---|---|
| 6,253,135 B1* | 6/2001 | Hubacher | 701/49 |
| 6,851,649 B1* | 2/2005 | Radford | 244/111 |
| 7,272,681 B2* | 9/2007 | Davies | 710/311 |
| 7,272,831 B2* | 9/2007 | Cota-Robles et al. | 718/1 |
| 7,607,129 B2* | 10/2009 | Rosu et al. | 718/1 |
| 8,028,040 B1* | 9/2011 | Hobbs et al. | 709/219 |
| 2002/0184289 A1* | 12/2002 | Katoh et al. | 709/100 |
| 2003/0182467 A1* | 9/2003 | Jensen et al. | 709/317 |
| 2004/0059477 A1* | 3/2004 | Kish et al. | 701/21 |
| 2004/0206854 A1* | 10/2004 | Shah et al. | 244/144 |
| 2004/0230712 A1* | 11/2004 | Belmar et al. | 710/15 |
| 2005/0177287 A1* | 8/2005 | Wang et al. | 701/36 |
| 2006/0206898 A1* | 9/2006 | Miner et al. | 718/104 |
| 2007/0277175 A1* | 11/2007 | Lutter | 718/102 |
| 2008/0098194 A1* | 4/2008 | Hashimoto et al. | 711/173 |
| 2008/0155153 A1* | 6/2008 | Yoshii et al. | 710/262 |
| 2008/0178261 A1* | 7/2008 | Yao et al. | 726/2 |
| 2008/0189700 A1* | 8/2008 | Schmidt et al. | 718/1 |
| 2008/0196043 A1* | 8/2008 | Feinleib et al. | 719/319 |
| 2008/0301673 A1* | 12/2008 | Kawasaki et al. | 718/1 |

OTHER PUBLICATIONS

Gernot Heiser, Virtualization for Embedded Systems, Nov. 13, 2007, Open Kernel Labs, (Heiser_2007.pdf; pp. 1-29).*
Intel, "Enhanced Virtualization on Intel Architecture-based Servers: Improve Utilization, Manage Change, Reduce Costs", http://www.intel.com/business/bss/products/server/virtualization_wp.pdf, dated 2006; 12 pages.
IBM, "Adding It Up: Virtualization Reduces IT Costs", http://www-03.ibm.com/systems/virtualization/view/031407.html, printed on Jul. 1, 2008; 3 pages.
Vyatta, "The Top Five Virtualization Mistakes", http://www.vyatta.com/download/whitepapers/Vyatta_BiggestVirtualizationMistakes.pdf, dated 2007; 8 pages.

* cited by examiner

*Primary Examiner* — Emerson Puente
*Assistant Examiner* — Hiren Patel
(74) *Attorney, Agent, or Firm* — Hope Baldauff, LLC (57) ABSTRACT

This description provides tools and techniques for virtualizing embedded systems. Systems are described for embedding into a vehicle, with the systems including subsystems and centralized physical platforms that include computing resources operating on behalf of the subsystems. Systems may also include shared bus systems that place the centralized physical platforms and the subsystems in communication with one another. The centralized physical platforms may also include virtualization layers for operating virtual machines, with the virtual machines being associated respectively with the subsystems.

12 Claims, 5 Drawing Sheets

VIRTUALIZING EMBEDDED SYSTEMS

BACKGROUND

When designing and manufacturing vehicles, several design criteria may come into play. For example, the higher the level of complexity within a system, the more hardware these systems tend to include. As the systems incorporate more hardware, the aggregate weight of the system tends to increase. As the system becomes heavier, it is more likely to consume more fuel in operation. Additional weight may also penalize performance of the system. In addition to weight considerations, increased system complexity may lead to increased development and design costs, maintenance costs, or the like.

SUMMARY

It should be appreciated that this Summary is provided to introduce a selection of concepts in a simplified form that are further described below in the Detailed Description. This Summary is not intended to be used to limit the scope of the claimed subject matter.

This description provides tools and techniques for virtualizing embedded systems. Systems are described for embedding into a vehicle, with the systems including subsystems and centralized physical platforms that include computing resources operating on behalf of the subsystems. Systems may also include shared bus systems that place the centralized physical platforms and the subsystems in communication with one another. The centralized physical platforms may also include virtualization layers for operating virtual machines, with some of the virtual machines being associated respectively with the subsystems.

The features, functions, and advantages discussed herein may be achieved independently in various embodiments of the present description or may be combined in yet other embodiments, further details of which can be seen with reference to the following description and drawings. In general, this description provides tools and techniques that may realize cost savings in the design, development, and deployment of embedded systems. Implementations of this description may also reduce the amount of hardware resources included in such designs, and may reduce the complexity of such embedded systems.

DETAILED DESCRIPTION

The following detailed description discloses various tools and techniques for virtualizing embedded systems. This detailed description is that are understood when read with the several drawing figures referred to herein. These drawing figures include reference numerals to facilitate mapping items in the description to items in the drawings. The first digit of these reference numerals indicate the drawing in which the corresponding item first appears.

Figure 1:
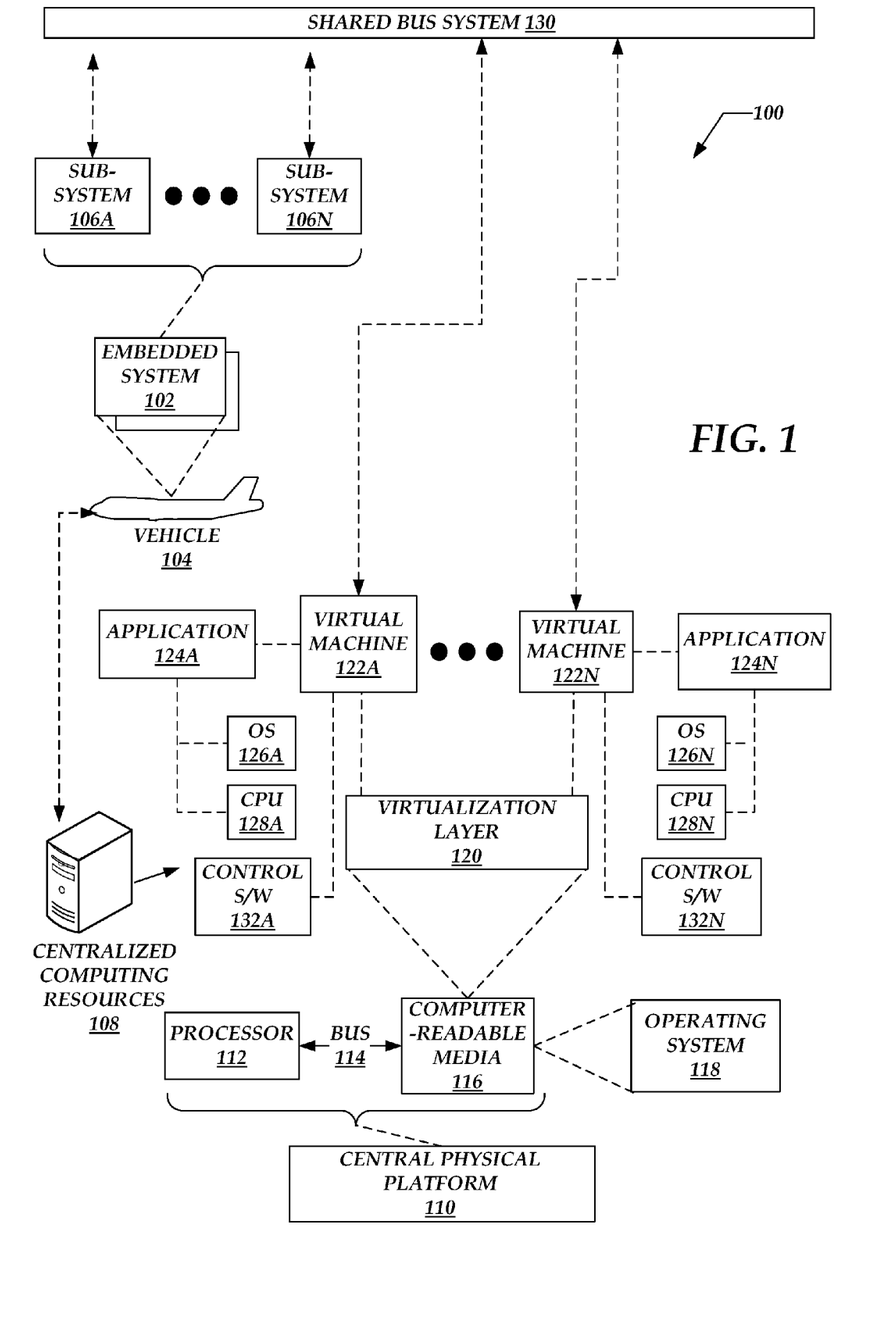
FIG. 1 is a block diagram illustrating systems or operating environments for virtualizing embedded systems.

FIG. 1 illustrates systems or operating environments, denoted generally at 100, for virtualizing embedded systems. These systems 100 may include one or more embedded systems 102. These embedded systems may reside in vehicles 104, examples of which may include land-going vehicles, aircraft, spacecraft, sea-going vehicles, or the like. The embedded systems 102 may include any number of subsystems for managing subcomponents of the embedded systems. For example, FIG. 1 illustrates subsystems 106a and 106n (collectively, subsystems 106). The subsystems 106 may represent processor-based management systems for radar systems, engines, communications systems, navigation systems, flight surface controls, or the like. Typically, these subsystems 106 may include devices, sensors, or other discrete units disposed at various locations as appropriate within the vehicle. In addition, the subsystems 106 may include processing units having relatively limited power, as well as related storage mechanisms, as described in further detail elsewhere herein.

The vehicle 104 may also include centralized computing resources, denoted generally at 108. The centralized computing resources 108 may include a suitable central physical platform 110. In turn, the physical platform 110 may include one or more processors 112, which may have a particular type or architecture, chosen as appropriate for particular implementations. The processors 112 may couple to one or more bus systems 114 that are chosen for compatibility with the processors 112.

The central physical platform 110 may include one or more instances of computer-readable storage media 116, which couple to the bus systems 114. The bus systems may enable the processors 112 to read code and/or data to/from the computer-readable storage media 116. The media 116 may represent storage elements implemented using any suitable technology, including but not limited to, semiconductors, magnetic materials, optics, or the like. The media 116 may include memory components, whether classified as RAM, ROM, flash, or other types, and may also represent hard disk drives.

The storage media 116 may include one or more modules of instructions that, when loaded into the processor 112 and executed, cause the platform 110 to provide virtualization services for the embedded systems 102. These modules may include, for example, an operating system 118 that manages the platform 110. In addition, these modules may include a virtualization layer 120, which serves as a software layer above the "hard" physical platform 110. The virtualization layer 120 may be integrated within the operating system 118, or may run on top of the operating system. The virtualization layer may operate one or more virtual machines (abbreviated as "V/M" in some of the drawings to conserve space) that correspond to the subsystems 106. FIG. 1 provides examples of a virtual machine 122a that corresponds to the subsystem 106a, and a virtual machine 122n corresponds to the subsystem 106n. However, it is noted that implementations of this description may include any number of subsystems 106 and virtual machines 122, with the example shown in FIG. 1 provided only to facilitate this description, but not to limit possible implementations.

The term "virtualization" as used herein may refer to techniques for hiding or separating the details or physical characteristics of computing resources from the way in which other systems, applications, or end users interact with those resources. Different aspects of virtualization may include presenting a single physical resource (e.g., a server, an operating system, an application, storage device, or other components) as multiple logical resources. Other aspects of virtualization may include presenting multiple physical resources (e.g., storage devices or servers) as a single logical resource.

Turning to the virtual machines 122 in more detail, the virtual machines may be defined to operate one or more applications in a respective operating system running within a virtual machine. FIG. 1 provides examples of such applications at 124a and 124n (collectively, applications 124), and provides examples of the operating systems at 126a and 126n (collectively, operating systems 126). These virtual machines may also execute the applications 124 and operating systems 126 using one or more virtual processors or central processing units (CPUs) 128a and 128n (collectively, virtual processors 128).

The operating systems 126 may or may not be the same type of operating system as the operating system 118 that may be running on the physical platform. Further, the operating system 126a may or may not be the same type of operating system as the operating system 126n. Likewise, virtual processors 128 may or may not be the same type as the physical processor 112 operating on the platform 110. Further, the virtual processor 128a may or may not be the same type as the virtual processor 128n. In some implementations, the virtual processor may be the same as the underlying physical processor. However, in other implementations, virtualization platforms may provide emulated virtual processors that are not the same as the underlying physical processor. As higher processing power becomes available for less cost, emulated solutions may become more attractive, allowing legacy applications to run in newer processing environments.

Some implementations of the operating systems (OSes) may be Just Enough Operating System (JeOS) operating systems. For example, real-time OSes and Linux™ operating systems may be customized in such implementations to reduce the overall size and footprint of the OSes, and to provide only the services that a given application requests. Some applications might not include an OS, as appropriate in different implementations.

Some implementations may use virtualization platforms that do not include virtual machines. In these virtualization platforms, fewer physical resources are virtualized, and the platforms provide containers for operating systems and applications. For the purposes of this description, the term "virtual machines" may be used interchangeably with the term "containers". However, container virtualization may complicate the management of redundancy, and partitioning containers may not be as strong as partitioning virtual machines.

The applications 124 may be written in any number of different programming languages. In addition, the application 124a may be written in one programming language and/or operating environment, and the application 124n may be written in a different programming language and/or operating environment. The central physical platform 110 may or may not support these programming languages. For example, the programming languages may be different if the virtual machines include emulated processors. However, the virtual machines 122 as presented by the virtualization layer 120 may map these programming languages as appropriate to run the applications on the central physical platform 110. Once the virtual machines 122 operate with a given programming language, they may continue to support applications 124 written in this programming language, even if the vendors who originally offered the programming language have discontinued support, and even if the physical platform 110 does not support this language (in scenarios that include emulated processors). As new programming languages become available, the virtual machines may be updated to map to these new programming languages. However, the previously-written applications may remain unchanged, despite introduction of these new languages.

The applications 124 may be specialized as appropriate to manage the different subsystems 106. These applications 124 may be written and supported by vendors who provide the different subsystems 106, and these vendors may or may not be the same as a manufacturer who produces and maintains the vehicle 104. Because the applications 124 are delivered to operate on virtual machines 122, the virtualization layer 120 may effectively isolate the applications 124 from the physical details of the platform 110. For example, as the hardware and components used to implement the physical platform 110 evolve over time, the virtual machines 122 may remain the same, despite these changes to the physical platform.

The centralized computing resources 108 may be located at a suitable location within the vehicle 104. For example, assuming that the vehicle 104 is an aircraft, the physical infrastructure for the centralized computing resources 108 may be located within the fuselage of this aircraft. Typically, hardware infrastructure associated with the subsystems 106 may be located within the vehicle 104 remotely from the centralized computing resources. For example, if the vehicle 104 includes multiple engines, respective instances of the subsystems 106 may be located near these engines so as to monitor their performance and change operating parameters of the engines as appropriate.

The subsystems 106 and the centralized computing resources 108 may communicate over a shared bus system 130, as opposed to providing each subsystem 106 with a dedicated communication pathway to the centralized computing resources 108. In this manner, the shared bus system 130 may enable the vehicle 104 to realize weight savings, as compared to previous approaches using dedicated communication pathways between components. In cases where multiple subsystems 106 are located within a given general area of the aircraft, the operating environments 100 may include data concentrators (not shown) that effectively multiplex communications from these several subsystems onto and off of the shared bus system 130.

As shown in FIG. 1, the operating environments 100 may include respective instances of controlling software 132a and 132n (collectively, controlling software 132), is associated with the virtual machines 122a and 122n. In some implementations, the controlling software 132 may be incorporated into the virtual machines. In general, the controlling software may coordinate the activities of the various subsystems (e.g., 106) within the centralized physical platform.

Having described the systems or operating environments in FIG. 1, the discussion now proceeds to a description of centralization scenarios for virtualizing embedded systems. This discussion is now presented with FIG. 2.

Figure 2:
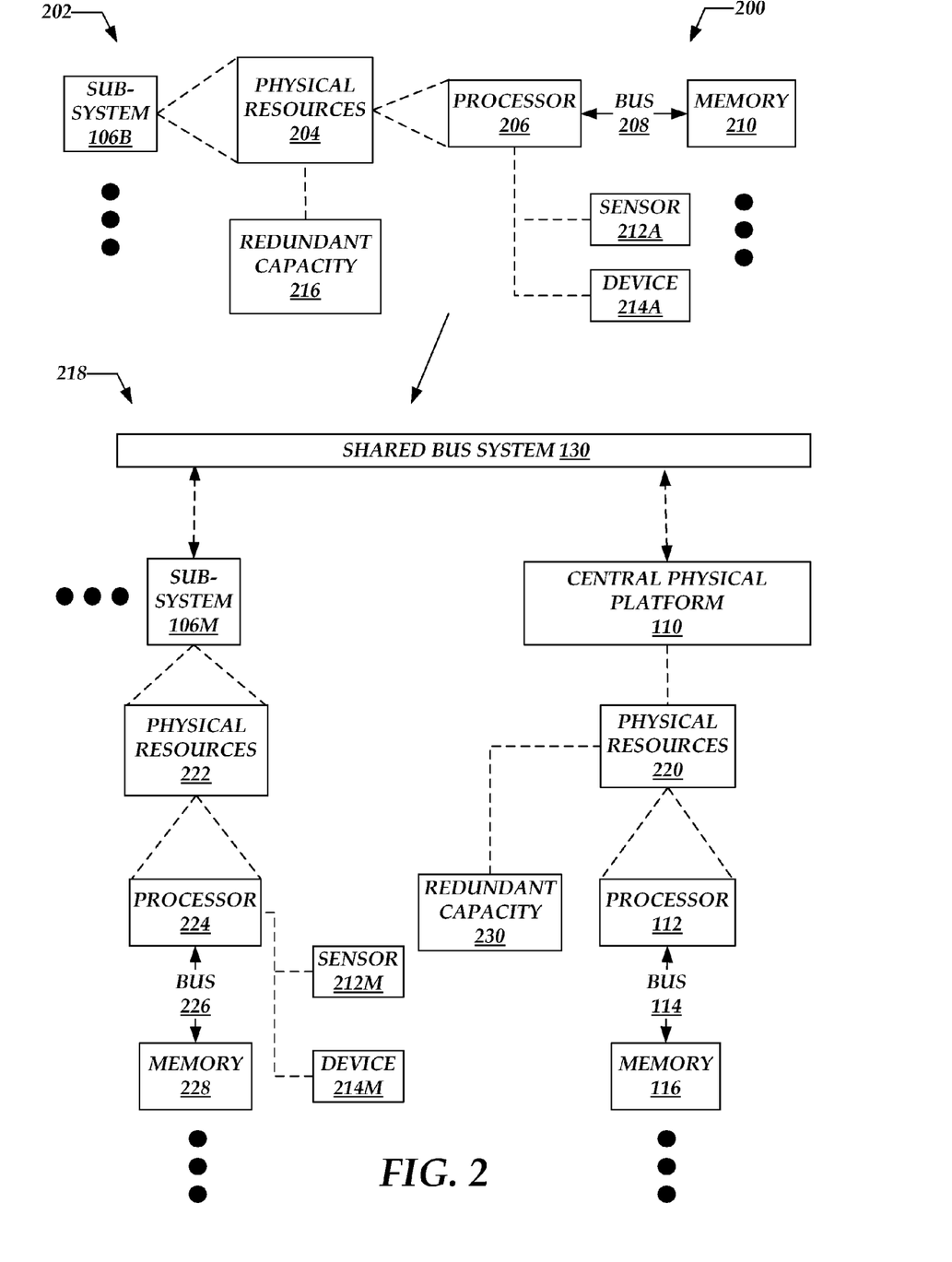
FIG. 2 is a block diagram illustrating scenarios in which subsystems may be centralized, so as to communicate with a central physical platform over a shared bus system.

FIG. 2 illustrates scenarios, denoted generally at 200, in which subsystems may be centralized so as to communicate with a central physical platform over a shared bus system. For conciseness of description and reference, not to limit possible implementations, FIG. 2 may carry forward certain items described previously, as labeled by identical reference numbers.

Turning to FIG. 2 in more detail, a given subsystem 106b in an initial state, denoted generally at 202, may include a set of physical resources 204. These physical resources may include one or more processing units 206, one or more bus systems 208 that places the processing units in communication with storage units, such as memory or storage resources 210. In addition, these physical resources 206 may also include any number of sensors 212a, devices 214a, or the like. Assuming that the subsystem 106b is allocated the task of monitoring a given system or component (e.g., an engine) within the vehicle (e.g., 104), these sensors and/or devices may be responsive to signals from the processor 206 to monitor and/or adjust the operational performance of the monitored component. It is noted that the physical resources to go for may include types of resources other than those shown in FIG. 2, with the items shown in FIG. 2 been provided only for example and convenience in discussion.

Typically, the various physical resources 204 may be designed to have a certain amount of redundancy or unused space, denoted generally at 216. These redundant resources may allow the subsystem 106b some excess resource capacity available to handle high-demand operating environments, without constantly running at maximum capacity. Since commercial processors may be used, it may be difficult to "right size" the processing capabilities to the application. In addition, while FIG. 2 illustrates an example of the subsystem 106b, it is noted that a given vehicle (e.g., 104) may include multiple instances of the subsystems 106b. In such scenarios, the redundant and/or unused resources 216 may be duplicated across these instances of the subsystems 106b. These redundant resources 216 may impose a considerable weight, space and power burden when considered across the entire vehicle.

As denoted generally at 218, certain resources and capabilities of the subsystem 106b may be transitioned to a central physical platform (e.g., carried forward at 110), along with an updated subsystem 106m, which is understood to be a relatively scaled-down version of the subsystem 106b. Turning first to the central physical platform 110, this platform may include a set of physical resources 220, which may include a processor (e.g., carried forward at 112), bus systems (e.g., carried forward at 114, and storage media (e.g., carried forward as memory 116). It is noted that the physical resources 220 may also include other items not shown in FIG. 2, with the items shown in FIG. 2 been provided for example only.

In the scenario shown at 218, the central physical platform may assume the processing burden on behalf of a plurality of subsystems (e.g., 106b) within a given vehicle. Accordingly, the physical resources 204 of the initial subsystem configurations 106b may be downsized to less-extensive physical resources 222 within an updated subsystem configuration 106m. Although the updated subsystem 106m may include a processor 224, this processor 224 may be of a different type, less expensive, less powerful, and smaller than the previous processor 206. This result may be achieved because the bulk of the processing burden has been allocated to the processor 112 of the central physical platform 110.

In scenarios where the processor 224 is smaller and less powerful than the previous processor 206, the updated processor 224 may be easier to harden or ruggedize against harsh physical environments, as may be encountered in implementations of the vehicle. For example, the processor 224 may be easier and less expensive to harden against environmental factors such as radiation, vibration, extreme heat or cold, or the like, as compared to the previous processor 206. In the updated scenarios 218, the processor 224 may support the sensors 212m, the devices 214m, and any other elements associated with the subsystem 106m. In some implementations, these sensors 212m may be the same as the sensors 212a, and the devices 214m may be generally the same as the devices 214a, but FIG. 2 denotes these items with separate reference numbers to facilitate this description.

Returning to the central physical platform 110, this platform may centralize any redundant resources provided on behalf of a variety of different subsystems 106m. FIG. 2 generally denotes this centralized redundancy at 230. Accordingly, the central physical platform 110 may provide redundancy on behalf of a variety of different subsystems 106, rather than the individual subsystems providing their own redundancy. In this manner, the central physical platform 110, in addition to virtualizing embedded systems within the vehicle, may also reduce the level of unused or redundant resources across the entire vehicle. The central physical platform may make this redundancy available to the subsystems (e.g., 106m) over the shared bus system 130.

Having described the centralization scenarios in FIG. 2, the discussion now proceeds to a description of how resources provided by the central physical platform may be partitioned for access by different virtual machines. This description is now provided with FIG. 3.

Figure 3:
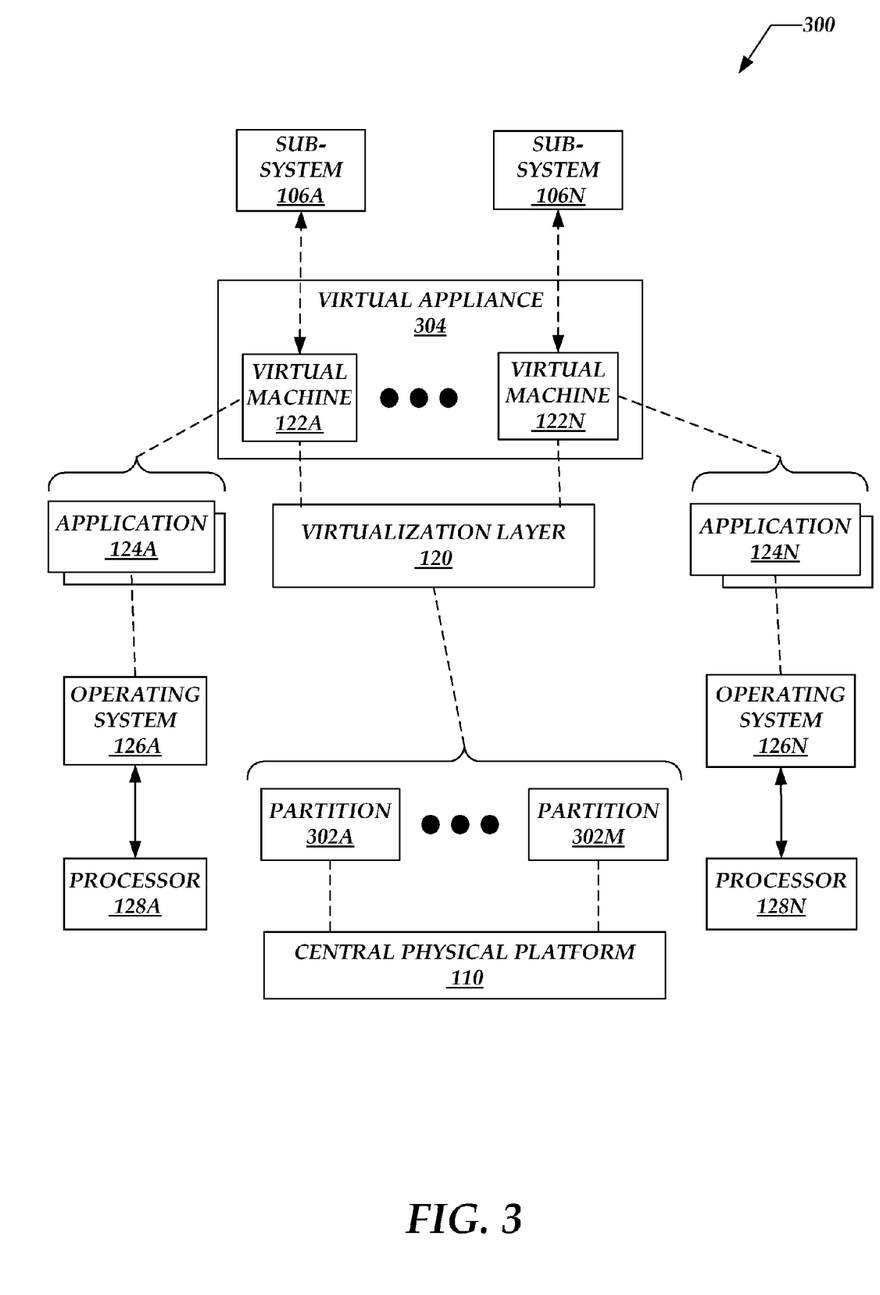
FIG. 3 is a block diagram illustrating partitioning schemes, in which resources provided by the central physical platform are partitioned for access by different virtual machines.

FIG. 3 illustrates scenarios, denoted generally at 300, in which resources provided by the central physical platform are partitioned for access by different virtual machines. For conciseness of description and reference, not to limit possible implementations, FIG. 3 may carry forward certain items described previously, as labeled by identical reference numbers.

Turning to FIG. 3 in more detail, the virtualization layer 120 may divide resources provided by the central physical platform 110 into a plurality of partitions, with FIG. 3 illustrates an example partitions 302a and 302m (collectively, partitions 302). The virtualization layer 120 may partition any resources provided by the central physical platform 110, including but not limited to, processor resources, storage resources, I/O resources, or the like. In addition, implemented systems of this description may partition the central physical platform into any convenient number of partitions.

The virtualization layer 120 may assign respective virtual machines (e.g., 122a and 122n) to operate within these partitions. In the example shown, the virtual machine 122a may utilize resources provided by the partition 302a, while the virtual machine 122n may utilize resources provided by the partition 302m.

As described above, the virtual machine 122a may operate on behalf of the subsystem 106a, and the virtual machine 122n may operate on behalf of the subsystem 106n. The virtual machine 122a may operate applications 124a on the virtual processor 128a and the virtual operating system 126a, and the virtual machine 122n may operate applications 124n on the virtual processor 128n and the virtual operating system 126n.

The partitioning scheme shown in FIG. 3 may provide a form of strong partitioning, in the sense that the virtual machines 122 are compartmentalized within the partitions 302. More specifically, if a virtual machine 122 were to malfunction, the partitioning scheme would limit the consequences or impact (i.e., "ripple effect") of such malfunctions to the partition containing the malfunctioning virtual machine. In this manner, the partitioning scheme would reduce the possibility of one malfunctioning virtual machine affecting the operation of other virtual machines.

The virtualization layer 120 may provide one or more virtual appliances 304 that include a collection of virtual machines 122. For the purposes of this description, the term "virtual appliance" has been extended to include one or more virtual machines, which together form a complete application or appliance. In the context of managing multiple subsystems within a given vehicle (e.g., 104), the virtual appliance construct may enable techniques of sub-dividing these management functions, and delegating these subdivided management functions to a plurality of subcontractors, internal workgroups, or the like. In turn, the subcontractors or internal workgroups may create applications (e.g., 124) that fulfill their delegated functions, and deliver these applications within appropriate virtual machines. The virtualization layer 120 may then manage the operation of these virtual machines on partitions 302 provided by the central physical platform 110.

Having described the scenarios for partitioning the resources of the central physical platform for access by different virtual machines in FIG. 3, the discussion now turns to a description of managing redundancy within virtual machines and virtual appliances. This discussion is now provided with FIG. 4.

Figure 4:
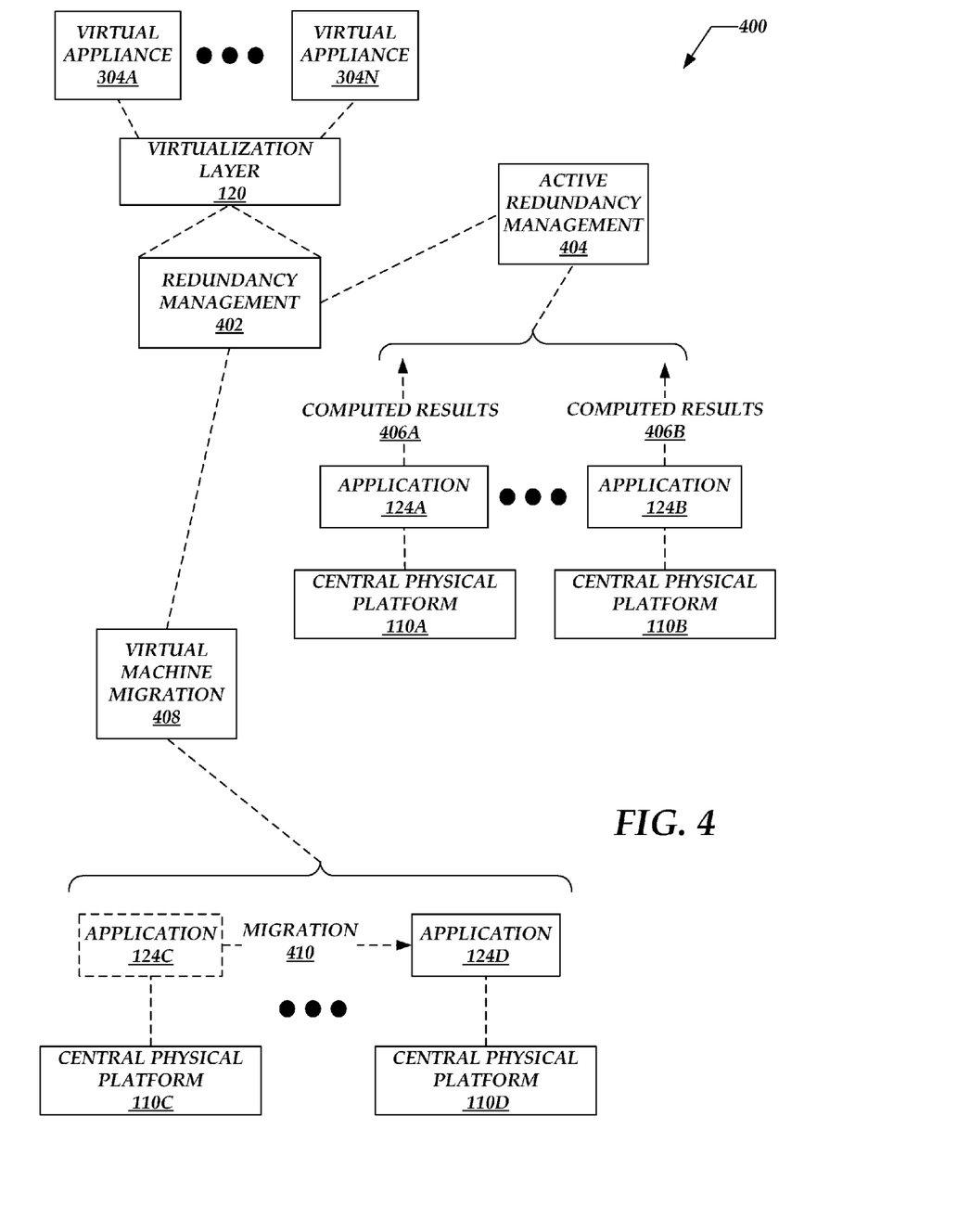
FIG. 4 is a block diagram illustrating different techniques for managing redundancy within virtual machines and virtual appliances.

FIG. 4 illustrates different techniques, denoted generally at 400, for managing redundancy within virtual machines and virtual appliances. For conciseness of description and reference, not to limit possible implementations, FIG. 4 may carry forward certain items described previously, as labeled by identical reference numbers.

Turning to FIG. 4 in more detail, the virtualization layer 120 may manage and operate one or more virtual appliances, with FIG. 4 illustrating two virtual appliances 304*a* and 304*n*. In turn, these virtual appliances 304 may include one or more virtual machines, not shown in FIG. 4 to promote clarity.

The virtualization layer 120 may provide redundancy management components, denoted generally at 402. The redundancy management components 402 may provide different types or levels of redundancy. For example, components 404 may actively manage redundancy. In the example shown, multiple instances of the central physical platform, denoted at 110*a* and 110*b*, may execute respective instances of example applications, denoted at 124*a* and 124*b*. The applications 124*a* and 124*b* may generate respective computed results, denoted at 406*a* and 406*b* (collectively, computed results 406). The active redundancy components 404 may track and monitor the computed results 406. When the computed results 406*a* and 406*b* diverge from one another, this may indicate that one or more of the corresponding applications 124*a* and 124*b*, or the underlying physical platforms, may be malfunctioning.

The redundancy management components 402 may also provide components 408 that migrate applications from one physical machine to another. For example, initially a given application 124*c* may be running on a central physical platform 110*c*. At some point, some aspect of the central physical platform 110*c* may malfunction, typically affecting the operation of the application 124*c*. In this scenario, the virtual machine migration components 408 may detect this situation. The migration components 408 may migrate or transition the application 124*c* from the malfunctioning physical platform 110*c* to a functioning physical platform 110*d*. FIG. 4 generally represents this migration at 410, and represents the migrated application at 124*d*.

Having described the different techniques for managing redundancy within virtual machines and virtual appliances in FIG. 4, the discussion now proceeds to a description of process flows for virtualizing embedded systems. This description is provided with FIG. 5.

Figure 5:
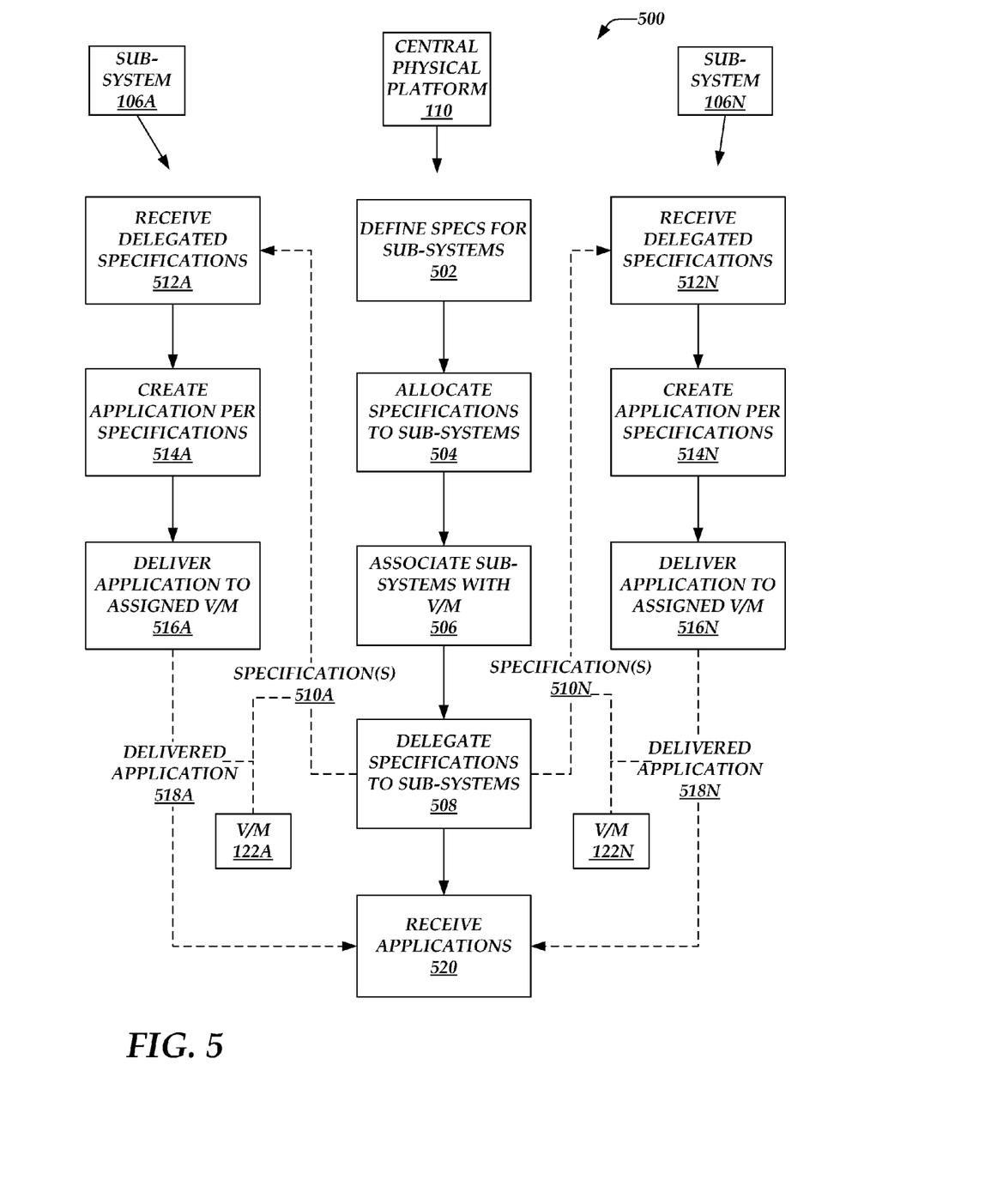
FIG. 5 is a flow diagram illustrating processes for virtualizing embedded systems.

FIG. 5 illustrates process flows, denoted generally at 500, for virtualizing embedded systems. For conciseness of description and reference, not to limit possible implementations, FIG. 5 may carry forward certain items described previously, as labeled by identical reference numbers.

As shown in FIG. 5, an example central physical platform 110 may operate virtual machines on behalf of subsystems 106*a* and 106*n*. To facilitate this description, but not to limit possible implementations, the process flows 500 are described in connection with the central physical platform and the subsystems 106. However, it is noted that other components may reform portions of the process flows 500, without departing from the scope and spirit of this description.

Turning to the process flows 500 more detail, block 502 generally represents defining specifications applicable to various subsystems within a given embedded system. For example, a given vehicle may include one or more embedded systems and subsystems (e.g., engine management systems, navigation systems, radar systems, or the like). In such scenarios, block 502 may include formulating specific specifications applicable to different subsystems, depending on the functions of these various subsystems.

Block 504 generally represents allocating previously-defined specifications to the appropriate subsystems within a given embedded system. FIG. 1 provides examples of subsystems at 106*a* and 106*n*, and provides an example of an embedded system at 102.

Block 506 generally represents associating particular subsystems with virtual machines operating on a central physical platform 110. FIG. 1 provides examples of virtual machines at 122*a* and 122*n*.

Block 508 generally represents delegating or transmitting specifications that are allocated to particular subsystems. FIG. 5 illustrates respective examples of such specifications, denoted at 510*a* and 510*n* (collectively, specifications 510), as allocated to particular subsystems. In the example shown, the specifications 510*a* are allocated to the subsystem 106*a*, and the specifications 510*n* are allocated to the subsystem 106*n*. In turn, blocks 512*a* and 512*n* represent the subsystems 106*a* and 106*n* respectively receiving the delegated specifications 510*a* and 510*n*.

Blocks 514*a* and 514*n* generally represent creating applications to run on behalf of the respective subsystems 106*a* and 106*n*. Blocks 514*a* and 514*n* may include creating applications to run on virtual machines (e.g., 122*a* and 122*n*) that are referenced in the specifications 510*a* and 510*n*.

Blocks 516*a* and 516*n* generally represent delivering the applications within the specified virtual machines. As described above, these virtual machines may specify particular operating environments in which the applications are to run. These operating environments may specify particular CPUs, operating systems, or other parameters for a given virtual machine. FIG. 5 provides two examples of delivered applications 518*a* and 518*n* (collectively, delivered applications 518), which may reference respective specified virtual machines 122*a* and 122*n*, as indicated by the dashed lines in FIG. 5.

Returning to the central physical platform, block 520 generally represents receiving the delivered applications 518. Block 520 may include receiving the delivered applications from the subsystems 106*a* and 106*n*, or may include receiving the delivered applications from a party acting on behalf of these subsystems 106. Once the central physical platform has received the delivered applications 518, the platform may begin executing these applications.

The subject matter described above is provided by way of illustration only and does not limit possible implementations. Various modifications and changes may be made to the subject matter described herein without following the example embodiments and applications illustrated and described, and without departing from the true spirit and scope of the present description, which is set forth in the following claims.

What is claimed is:

1. A system for embedding into a vehicle, the system comprising:
    a plurality of subsystems;
    a centralized physical platform that includes computing resources operating on behalf of the subsystems;
    a shared bus system placing the centralized physical platform and the subsystems in communication with one another;
    a plurality of processors, each processor being connected to at least one of a sensor or a device to at least one of monitor or adjust the operational performance of the sensor or device, the processor also being at least one of: (i) hardened against at least one of environmental factors, radiation, vibration, extreme heat, or extreme cold, (ii) a different type to run a different operating system than an operating system that a processor operating on the centralized physical platform is to run, (iii) less powerful than a processor operating on the centralized physical platform, or (iv) smaller than a processor operating on the centralized physical platform;
    wherein the centralized physical platform is in communication with the plurality of processors over the shared bus system; and
    wherein the centralized physical platform includes a virtualization layer for operating a plurality of virtual machines, wherein a first subset of the virtual machines are associated respectively with the subsystems and a second subset of the virtual machines provide core system functionality;
    a further central physical platform managed by a redundancy management component;
    wherein at least one of the central physical platform or the further central physical platform executes an instance of an application on behalf of the subsystems;
    wherein the redundancy management component includes at least a subcomponent for migrating the application from the central physical platform to the further central physical platform and a subcomponent for actively managing redundant resources provided by the central physical platform and the further central physical platform, and
    wherein the subcomponent monitors the performance of both instances of the application when executing on the central physical platforms.

2. The system of claim 1, further comprising respective applications executed on the virtual machines on behalf of the subsystems.

3. The system of claim 2, wherein at least one of the applications is written in a programming language to run on one of the virtual machines, and wherein the one of the virtual machines is operative to map the application to execute on the centralized physical platform.

4. The system of claim 3, wherein at least a further one of the applications is written in a further programming language, different than the programming language, to run on a further one of the virtual machines, and wherein the further one of the virtual machines is operative to map the further application to execute on the centralized physical platform.

5. The system of claim 1, wherein a first one of the virtual machines virtualizes a first CPU and runs a first operating system, and wherein at least a second one of the virtual machines virtualizes a second CPU and runs a second operating system.

6. The system of claim 1, wherein the central physical platform provides redundant resources on behalf of the subsystems.

7. The system of claim 6, wherein the subsystems are adapted to utilize the redundant resources provided by the central physical platform, and wherein the subsystems do not themselves provide redundant resources.

8. The system of claim 1, wherein the virtualization layer is adapted to divide resources provided by the central physical platform into a plurality of partitions, and is for associating virtual machines respectively with the partitions.

9. The system of claim 1, embedded into the vehicle.

10. At least one non-transitory computer-readable storage medium having computer-executable instructions stored thereon that, when executed by a computer, cause the computer to perform a method comprising:
    a first process of:
        defining respective specifications for a plurality of subsystems operating within an embedded system;
        allocating particular specifications to respective subsystems;
        associating respective subsystems with corresponding virtual machines;
        delegating the particular specifications to the respective subsystems;
        receiving applications that are delivered on behalf of the subsystems to the virtual machines associated with the subsystems; and
        communicating with a plurality of processors to at least one of monitor or adjust the operational performance of a sensor or device, each processor being connected to the at least one sensor or a device, the processor also being at least one of: (i) hardened against at least one of environmental factors, radiation, vibration, extreme heat, or extreme cold, (ii) a different type to run a different operating system than an operating system that the computer is to run, (iii) less powerful than the computer, or (iv) smaller than the computer;
        wherein the instructions for associating respective subsystems with corresponding virtual machines include instructions for associating subsystems with virtual machines that virtualize processors and run respective operating systems; and
    a second process of:
        receiving delegated specifications from a central physical platform associated with an embedded system operating within a vehicle, wherein the delegated specifications reference a virtual machine associated with a subsystem within the embedded system, the virtual machine virtualizing a respective processor running a respective operating system;
        creating at least one application to operate within the virtual machine;
        delivering the application, operative within the virtual machine, to the central physical platform; and
        communicating with at least one processor to at least one of monitor or adjust the operational performance of a sensor or device, the processor being connected to the at least one sensor or a device, the processor also being at least one of: (i) hardened against at least one of environmental factors, radiation, vibration, extreme heat, or extreme cold, (ii) a different type to run a different operating system than an operating system that the computer is to run, (iii) less powerful than the computer, or (iv) smaller than the computer.

11. The computer-readable storage medium of claim 10, wherein the instructions for receiving applications include instructions for receiving at least one application developed in a programming language.

12. The computer-readable storage medium of claim 11, wherein the instructions for receiving applications include instructions for receiving at least a further application developed in at least a further programming language.

* * * * *